March 5, 1940.  L. L. PAYNE  2,192,693
WASH PIPE
Filed May 7, 1938
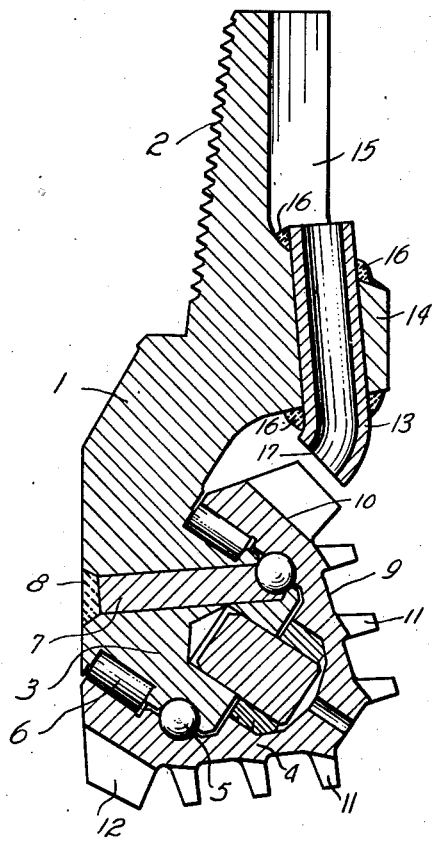
LYLE L. PAYNE
INVENTOR
BY Jesse R. Stone
ATTORNEY Patented Mar. 5, 1940

2,192,693

UNITED STATES PATENT OFFICE 2,192,693

WASH PIPE

Lyle L. Payne, Midland, Tex., assignor to Hughes Tool Company, Houston, Tex., a corporation of Delaware Application May 7, 1938, Serial No. 206,527

2 Claims. (Cl. 255—71)

The invention relates to an improvement in well drills, particularly drills of the cone bit type wherein the cutters have an approximately conical shape toward the inner end.

In well drills of this type it is customary to use two or more cutters each of which is mounted on a separate section upon the drill head and adapted to roll upon the well bottom as the drill head is rotated. Such cutters are approximately cylindrical adjacent the base, but are tapered toward their inner ends. The cutters cut rapidly and in softer formations must be kept clear of the formation being cut by means of the flushing fluid. Heretofore this flushing fluid has been discharged through the drill head axially of the drill or at an angle longitudinally of the cutter. This method has not been entirely satisfactory and the cutters are not cleared of material adjacent the base of the cutters.

It is an object of this invention to discharge the flushing fluid at an angle to the drill axis and approximately perpendicular to the base teeth of the cutter.

I desire to so form the tube or nozzle through which the flushing fluid is discharged that it will direct the flushing fluid directly against the base teeth at a most efficient manner to clear said teeth of material tending to clog the cutter.

In the drawing herewith is shown one section of a drill head taken in longitudinal section therethrough and illustrating my improved wash pipe.

The section shown is part of a three-cone bit and illustrates how the wash pipe is mounted on such a section, it being understood that each of the three sections is thus provided with a wash pipe for its individual cutter.

The head section 1 has an upwardly tapered and threaded shank 2 thereon. At the lower end of the head is an inwardly and downwardly inclined cutter shaft 3. A cutter 4 is mounted thereon to surround the end of the shaft and is provided with the usual ball bearings 5 and roller bearings 6, which enables the cutter to rotate easily upon the shaft. The balls are inserted into position after the cutter is mounted on the shaft and are held in place by the plug 7 fixed in position by the welding bond 8.

The cutter has a forward conical area 9 and an outer area 10 which is tapered only slightly. Teeth 11 are formed on the area 9 and heavier teeth 12 are formed upon the area 10. This outer area 10 cuts a large proportion of the hole because of its longer path and tends to clog with material which is being cut.

To keep this area clear I jet a stream of flushing fluid directly upon the same at approximately right angles thereto. This is done by the use of the tube or nozzle 13. Said tube extends through the wall 14 at the lower end of the passage 15 through the head of the drill. It is secured in position by bonds of welding material 16 at both sides of the wall. The lower end of the tube is curved so that the nozzle 17 is pointed directly against the area 10 of the cutter. The flushing fluid is thus adapted to cut away the material tending to clog the cutter teeth 12 and it is assured that the cutter will continue to cut in all formations. The flushing fluid also washes through between the teeth on the surface 9 so that this area is also cleaned.

By thus forming and positioning the wash pipe in the head of the drill each cutter will be acted upon by the stream of cutting fluid in the most efficient manner and the speed of drilling will be materially increased.

What I claim as new is:

1. A well drill including a head, a cutter shaft thereon, an approximately conical cutter enclosing the end of said shaft and rotatable thereon, elongated cutting teeth adjacent the base of said cutter and a nozzle for flushing fluid in said head including a tube extending downwardly through said head and curved laterally at its lower end, to discharge flushing fluid at approximately right angles to said base teeth.

2. A well drill bit section formed to interfit with similar sections to form a bit head, a downwardly inclined shaft on said section, a cutter mounted on said shaft to enclose the end thereof, a row of teeth extending longitudinally of the base of said cutter and a tube for flushing fluid extending downwardly through the lower part of said section, the lower end of said tube being curved laterally to discharge said fluid at approximately right angles to the sides of said teeth.

L. L. PAYNE.